(12) United States Patent
Martin et al.

(10) Patent No.: US 8,573,524 B2
(45) Date of Patent: Nov. 5, 2013

(54) SKELETALIZED REEL SIDE PLATE (75) Inventors: David H. Martin, Tulsa, OK (US);
Clark Patrick McCune, Jenks, OK (US); James E. Therrell, Broken Arrow, OK (US); Hyunkyu Kim, Broken Arrow, OK (US); Joshua M. Denton, Broken Arrow, OK (US); Yanna Wu, Guang Dong (CN)

(73) Assignee: W.C. Bradley/Zebco Holdings, Inc., Tulsa, OK (US)

(*) Notice: Subject to any disclaimer, the term of this patent is extended or adjusted under 35 U.S.C. 154(b) by 662 days.

(21) Appl. No.: 12/753,377

(22) Filed: Apr. 2, 2010

(65) Prior Publication Data
US 2011/0240785 A1 Oct. 6, 2011

(51) Int. Cl.
*A01K 89/01* (2006.01)

(52) U.S. Cl.
USPC .......................................... 242/310; 242/311

(58) Field of Classification Search
USPC ................................................ 242/310, 311
See application file for complete search history.

(56) References Cited

U.S. PATENT DOCUMENTS

| | | | |
|---|---|---|---|
| 2,150,088 A | 3/1939 | White | |
| 2,457,323 A | 12/1948 | Sharps | |
| D247,442 S | 3/1978 | Hiraishi et al. | |
| 4,585,182 A * | 4/1986 | Atobe | 242/223 |
| 5,127,603 A | 7/1992 | Morimoto | |
| 5,308,019 A * | 5/1994 | Karlsson | 242/279 |
| 5,407,144 A | 4/1995 | Ryall | |
| 5,755,391 A | 5/1998 | Sacconi | |
| 5,797,554 A * | 8/1998 | Atherton et al. | 242/316 |
| 5,839,682 A | 11/1998 | Kim | |
| 5,855,331 A * | 1/1999 | Morimoto et al. | 242/310 |
| 5,921,488 A * | 7/1999 | DeGrenier | 242/238 |
| 6,000,652 A * | 12/1999 | Zwayer et al. | 242/238 |
| 6,032,894 A | 3/2000 | Chapman et al. | |
| 6,070,822 A * | 6/2000 | Zwayer et al. | 242/310 |
| 6,138,935 A * | 10/2000 | Zwayer et al. | 242/311 |
| 6,152,389 A * | 11/2000 | Kim | 242/260 |
| 6,321,816 B1 | 11/2001 | Koreska | |
| 6,382,545 B1 | 5/2002 | Yeh | |
| 6,460,793 B1 | 10/2002 | Hirayama et al. | |
| 6,550,709 B2 | 4/2003 | Vashro | |
| 7,077,350 B2 | 7/2006 | Koelewyn | |
| 7,077,351 B2 | 7/2006 | Myojo et al. | |
| 7,275,705 B1 * | 10/2007 | Wong et al. | 242/311 |

(Continued)

OTHER PUBLICATIONS

Okuma Fishing, "Spinning Reel: Crossover Construction", "www.international.okumafishing.com/technology.html".

(Continued)

*Primary Examiner* — Emmanuel M Marcelo
(74) *Attorney, Agent, or Firm* — Fellers, Snider, Blankenship, Bailey & Tippens, P.C.

(57) ABSTRACT

A fishing reel has a frame. A first cover assembly is affixed to a first side of the frame. A second cover assembly is affixed to a second side of the frame. At least one of the first cover assembly and the second cover assembly define at least one opening for receiving a panel member. The cover assemblies define supporting structure that is preferably made of a metal. The panel member defines non-supporting structure that is preferably made up of non-metallic structure such as plastic polymer and carbon fiber. The panel member may be transparent and is preferably replaceable to allow a user to customize the appearance of the reel.

21 Claims, 7 Drawing Sheets

(56) References Cited

U.S. PATENT DOCUMENTS

| | | |
|---|---|---|
| D558,299 S | 12/2007 | Lepage et al. |
| 7,306,179 B2 | 12/2007 | Venes |
| 7,341,215 B2 * | 3/2008 | Martin et al. ............. 242/310 |
| 7,350,730 B2 | 4/2008 | Hyun |
| 7,686,242 B2 * | 3/2010 | Lee ........................ 242/311 |
| 7,798,439 B2 * | 9/2010 | Tsutsumi ................. 242/257 |
| 2003/0075632 A1 | 4/2003 | Myojo |
| 2004/0041046 A1 * | 3/2004 | Nishimura ............... 242/310 |
| 2004/0075005 A1 * | 4/2004 | Myojo et al. ............. 242/310 |
| 2011/0174909 A1 | 7/2011 | Shibata et al. |

OTHER PUBLICATIONS

Pflueger Reels, "Pflueger President XT", "www.pfluegerfishing.com/products/products.php?p=77".

* cited by examiner

SKELETALIZED REEL SIDE PLATE

FIELD OF THE INVENTION

This invention relates generally to fishing reels. More particularly, the invention relates to fishing reels having a construction that facilitates weight reduction and a customizable appearance.

BACKGROUND OF THE INVENTION

In the high end fishing reel market, one way to achieve added value is through reduction in overall reel weight. Anglers, for example, want lighter reels for better rod balance, less fatigue, and more comfort. The current reel market is plateauing in its efforts to reduce reel weight. Reductions in reel weight are measured in tenths of an ounce, and significant reductions in weight can provide large competitive advantages.

Reel manufacturers are constantly working to remove every possible ounce out of their products. To date, methods used to achieve this weight reduction include overall reduction in size, lighter and stronger materials, and better designs leading to reduction in number of components.

SUMMARY OF THE INVENTION

The fishing reel of the invention includes a frame. In a preferred embodiment, a first cover assembly is affixed to a first side of the frame and a second cover assembly is affixed to a second side of the frame. Preferably, at least one of the first cover assembly and the second cover assembly define at least one opening for receiving a panel member sized to be received within the opening. By providing an opening or multiple openings in the cover assemblies, the supporting structure of the cover assembly is diminished, i.e., the cover assembly is "skeletalized". Lightweight panel members may be inserted in the openings, thereby resulting in a lightweight cover assembly as compared to a cover assembly constructed entirely of supporting material.

In a second embodiment, a shroud is provided that is visible through the openings. The shroud provides a barrier to dust intrusion, provides gear system protection, etc.

The panel members are preferably non-supportive cosmetic covers. The cover assemblies are preferably designed in such a way that the only functional supports are manufactured using metals, such as aluminum, titanium, or magnesium. Preferably, at least ⅓ by weight of the metal material is removed. The resulting openings may receive panel members that are non-supportive. The non-supportive panel members or the shroud can consist of plastic polymer, carbon fiber, non-supportive metal, or other non-metal materials. Additionally, the non-supportive cosmetic panel members can be constructed of a clear material, thus allowing viewing of internal parts of the reel.

Another potential advantage of utilizing a skeletal cover assembly along with non-supportive cosmetic panel members or a shroud is the ability to make the appearance of a reel customizable by consumers. The panel members or shroud member may be replaceable, thereby allowing a consumer to select the color or other features of selected panel members to customize the appearance of the reel. The amount of the outer surface of the cover assembly of the reel that is comprised of panel members is preferably significant enough to allow for the reel to get an entirely new overall look, depending on the panel members or shroud member selected by the user.

DETAILED DESCRIPTION OF THE PREFERRED EMBODIMENTS

Figure 1:
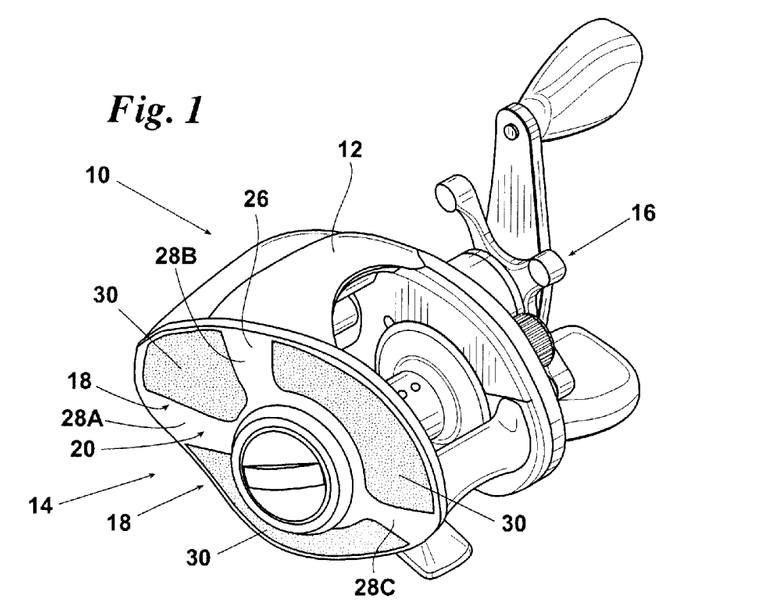
FIG. 1 is a perspective view of a reel of the invention having a skeletalized outer member.
Figure 2:
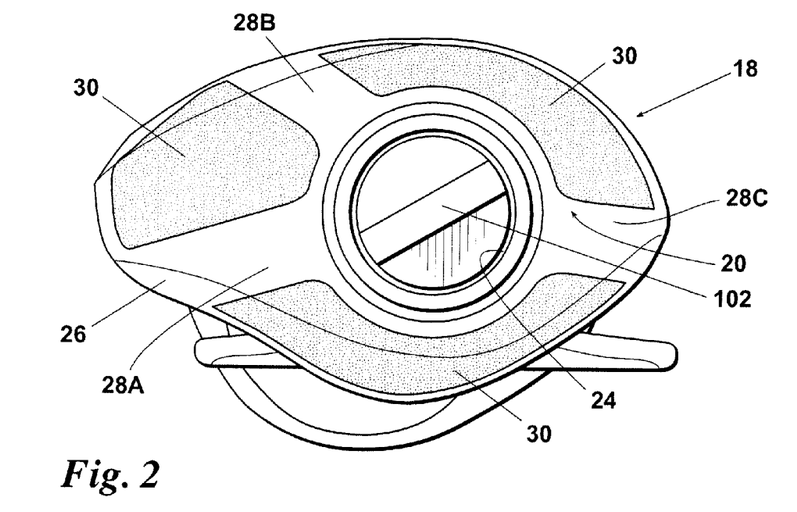
FIG. 2 is a side view of the reel of FIG. 1 showing a palm side skeletalized outer member.
Figure 3:
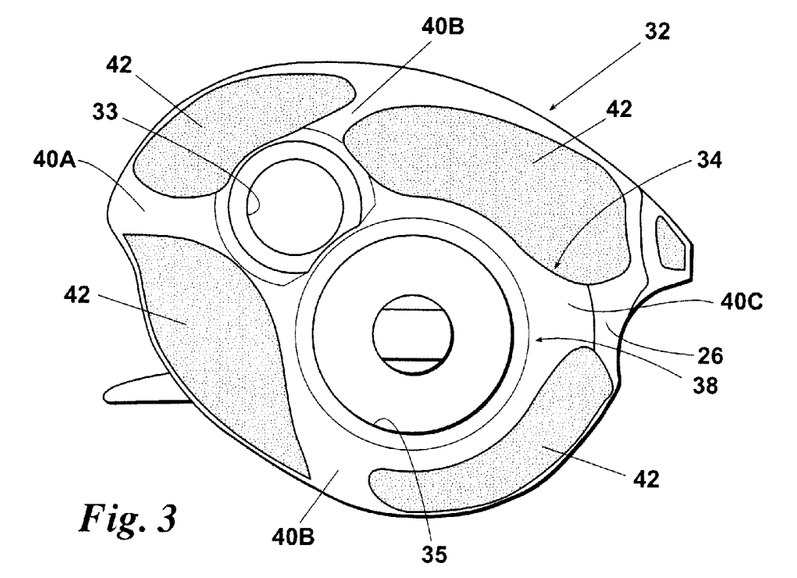
FIG. 3 is a side view of the reel of FIG. 1 showing a gear side skeletalized outer member.
Figure 7:
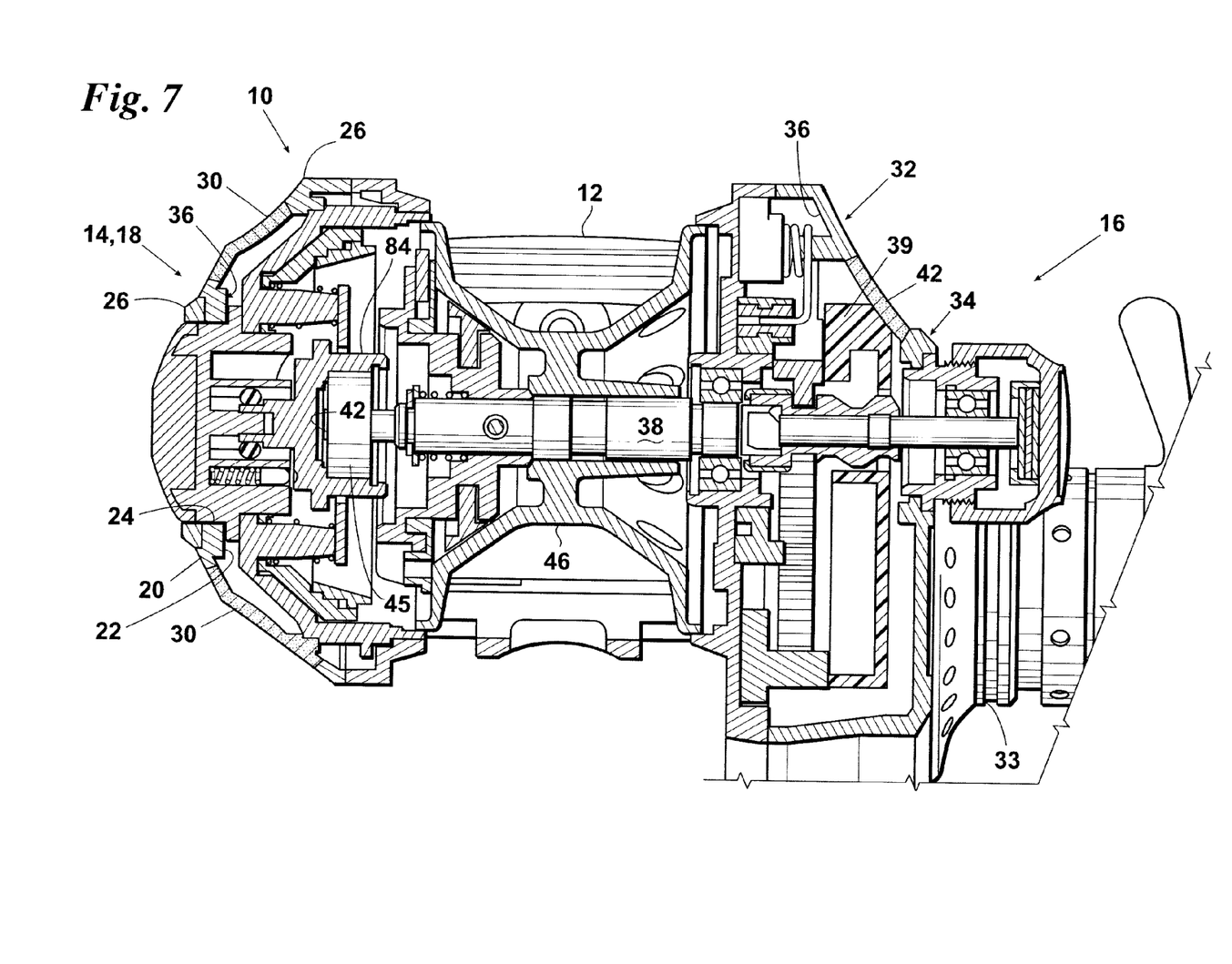
FIG. 7 is a cross-sectional view of the reel of FIG. 1.

Shown in FIGS. 1 and 7 is a reel designated generally 10. Reel 10 includes frame 12 (FIGS. 1 and 7) having palm side 14 and gear side 16. An outer member, such as palm side cover assembly 18, has outside surface 20 and inside surface 22. Inside surface 22 of palm side cover assembly 18 is affixed to palm side 14 of frame 12. Palm side cover assembly 18 defines dial orifice 24. Palm side cover assembly 18 (FIGS. 1, 2, 4, 7) defines a skeletal member 26, which is constructed of a strong material such as metals like aluminum, titanium, or other materials. A portion of skeletal member 26 is visible on outside surface 20. For example, legs 28A, 28B, and 28C communicate with dial orifice 24. Interspersed between legs 28A, 28B and 28C are panel members 30. Panel members 30 are preferably constructed of lightweight materials, such as carbon fiber, plastics, or other materials. Panel members 30 may be transparent, translucent, or opaque, as desired.

A second outer member, such as gear side cover assembly 32 (FIGS. 3, 5, 6, 7), has outside surface 34 and inside surface 36. Inside surface 36 of gear side cover assembly 32 is affixed to gear side 16 of frame 12. Gear side cover assembly 32 defines spool shaft orifice 33 and crank shaft orifice 35. Gear side cover assembly 32 is defined by second skeletal member 38, which is constructed of a strong material such as metals like aluminum, titanium, or other materials. A portion of second skeletal member 38 is visible on outside surface 34. For example, legs 40A, 40B, 40C, and 40D communicate with spool shaft orifice 33 and crank shaft orifice 35. Interspersed between legs 40A, 40B, 40C, and 40D are panel members 42. Panel members 42 are preferably constructed of lightweight materials, such as carbon fiber, plastics, or other materials. Panel members 42 may be transparent, translucent, or opaque, as desired. A support member 39 (FIGS. 5-7) may be provided to assist in restraining components adjacent to inside surface 36 of gear side cover assembly 32.

Referring now primarily to FIG. 7, palm side spool shaft ball bearing 45 supports palm end 42 of spool shaft 38. Palm side ball bearing 45 is received within central member 84 of brake spool cover 82, discussed below. Spool assembly 46 is mounted on spool shaft 38.

Figure 4A:
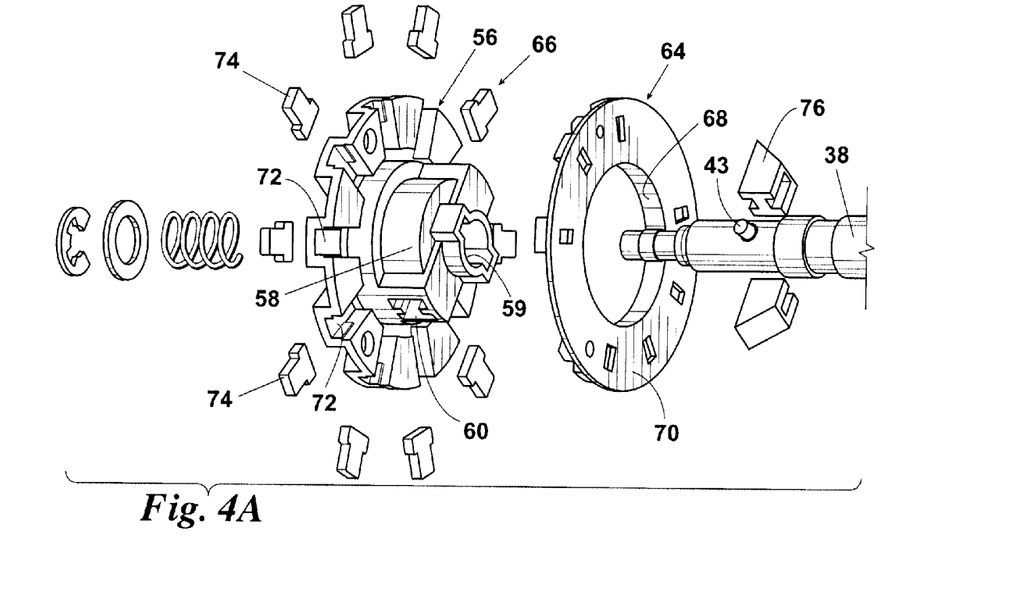
FIG. 4A is an exploded view of a first portion of the brake shoe assembly of the reel of FIG. 1.
Figure 4B:
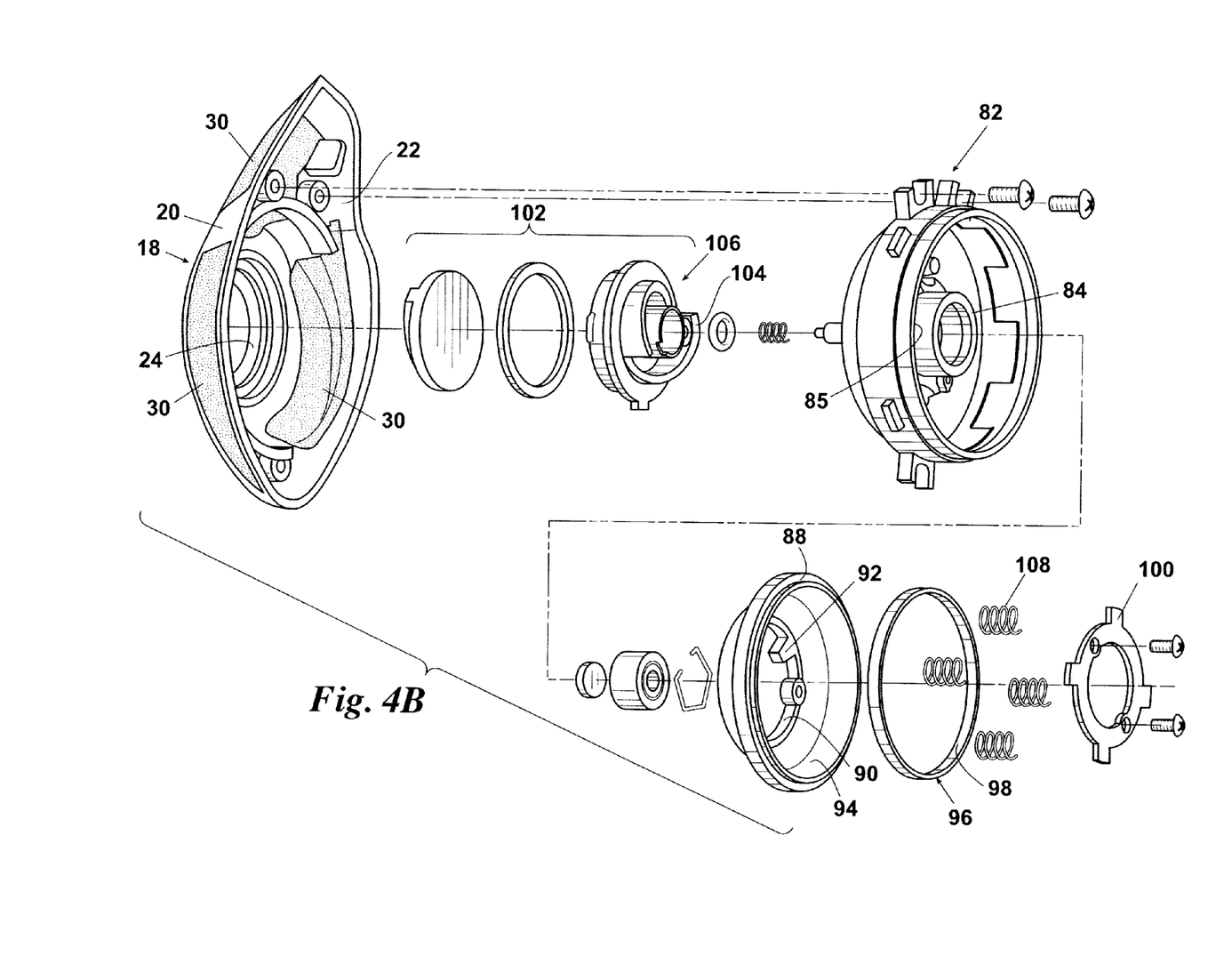
FIG. 4B is an exploded view of a second portion of the brake shoe assembly of the reel of FIG. 1.

Referring now primarily to FIGS. 4A and 4B, shown is a brake assembly. "Brake assembly" refers to the combination of brake shoe retainer 56, brake shoe holder 64, brake shoes 74, and speed adjust shoes 76. Brake shoe retainer 56 defines central protuberance 58. A plurality of speed adjust shoe retainers 60 are defined by central protuberance 58 of brake shoe retainer 56. Central protuberance 58 defines an orifice for receiving spool shaft 38. The orifice additionally defines pin slot 59 for receiving pin 43.

Brake shoe holder 64 is affixed to gear side 66 of brake shoe retainer 56 and surrounds spool shaft 38. Brake shoe holder 64 has a central orifice 68 for receiving central protuberance 58 of brake shoe retainer 56. Brake shoe holder 64 additionally defines a smooth gear side surface 70 (best seen in FIG. 4). Brake shoe holder 64 and brake shoe retainer 56 define a plurality of brake shoe receptacles 72 therebetween.

Brake spool cover 82 (FIG. 4B) is affixed to inside surface 22 of palm side cover assembly 18. Brake spool cover 82 has a central member 84. Central member 84 is raised above a lower surface of brake spool cover 82 by a plurality of legs 85.

Still referring to FIG. 4B, brake ring support 88 has a central orifice 90 that receives central member 84 of brake spool cover 82. Brake ring support 88 defines a cam follower 92 and a brake receiving area 94. Cam follower 92 passes between the legs of brake spool cover 82 to make contact with cam surface 104 of brake central dial assembly 102 for moving brake spool cover 82 in an axial direction, depending upon the rotation of brake control dial assembly 102, discussed below.

Continuing with reference to FIG. 4B, brake ring 96 is located within brake receiving area 94 of brake ring support 88. Brake ring 96 has a sloped brake shoe engaging surface 98. Brake ring slider spring retainer 100 is affixed to a gear side of brake spool cover 82.

Infinitely adjustable brake control dial assembly 102 defines cam surface 104 on gear side 106. Cam surface 104 is received within a space defined in part by a palm side surface of central member 84 and in part by legs 85 to make contact with cam follower 92 of brake ring support 88, which passes therethrough. A plurality of brake frame assembly springs 108 are in contact with brake ring slider spring retainer 100 and bias cam follower 92 of brake ring support 88 into contact with cam surface 104 of brake control dial assembly 102.

By turning infinitely adjustable brake control dial 102, a location of brake ring support 88 can be set to any position depending on the orientation of cam surfaces 104. Brake ring support 88 is biased against cam surfaces 104 by springs 108. The result is that the position of brake ring 96 may be infinitely adjustable with regard to brake shoe retainer 56.

The brake shoe assembly, including brake shoe retainer 56 and brake shoe holder 64, is free to slide in an axial or thrust direction along spool shaft 38. The axial movement results in pin 43 moving within pin slot 59. The brake shoe retainer 56 is biased towards gear side 16 by speed adjust spring 80.

Figures 5, 6, 8:
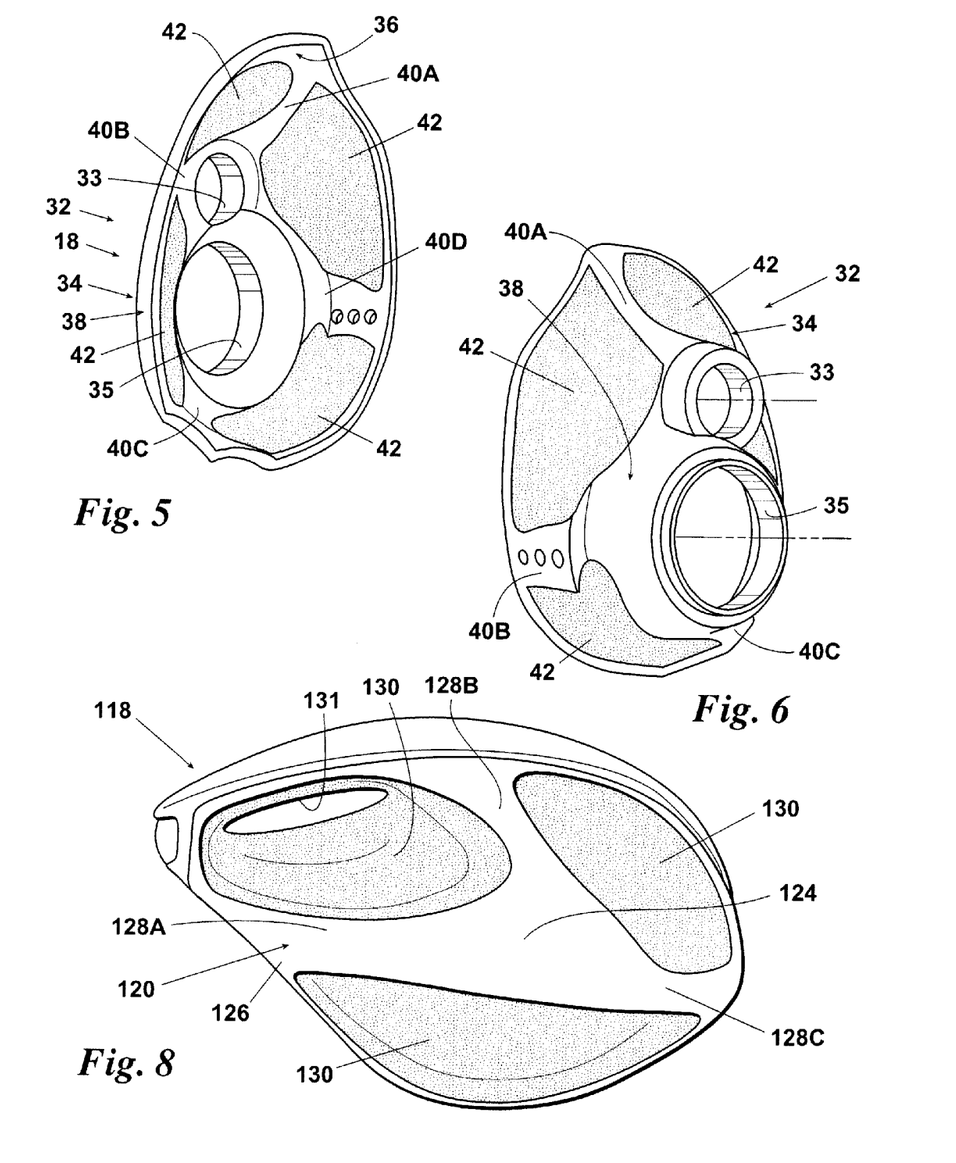
FIG. 5 is a perspective view of an inside surface of the gear side skeletalized outer member of FIG. 3.
FIG. 6 is a perspective view of an outside surface of the gear side skeletalized outer member of FIG. 3.
FIG. 8 is a side view of a reel showing a second embodiment of a palm side skeletalized outer member.
Figure 9:
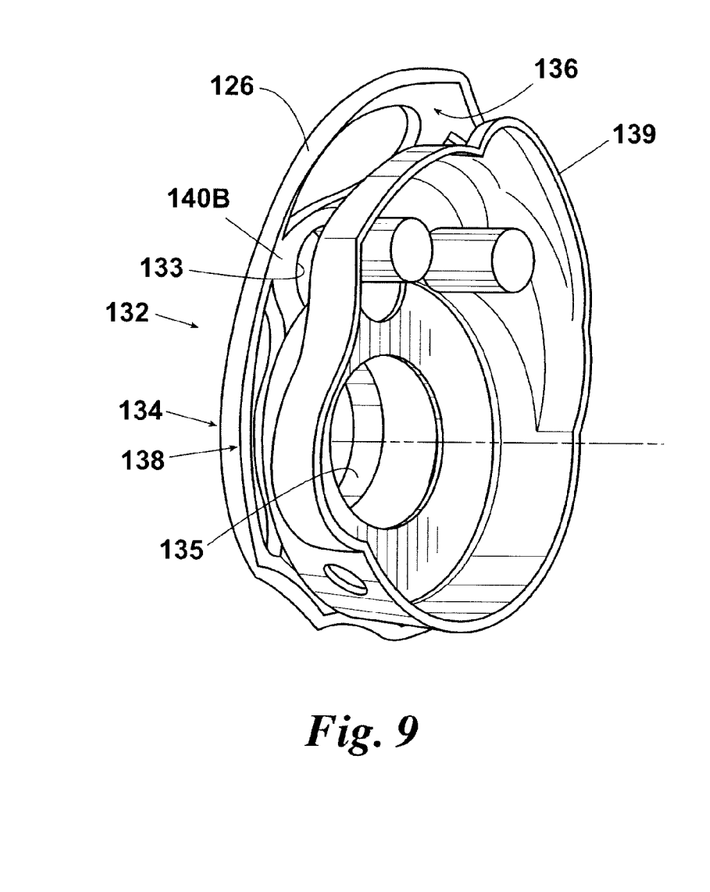
FIG. 9 is a perspective view of an inside surface of a second embodiment of a gear side skeletalized outer member and an inside surface of a shroud member.
Figure 10:
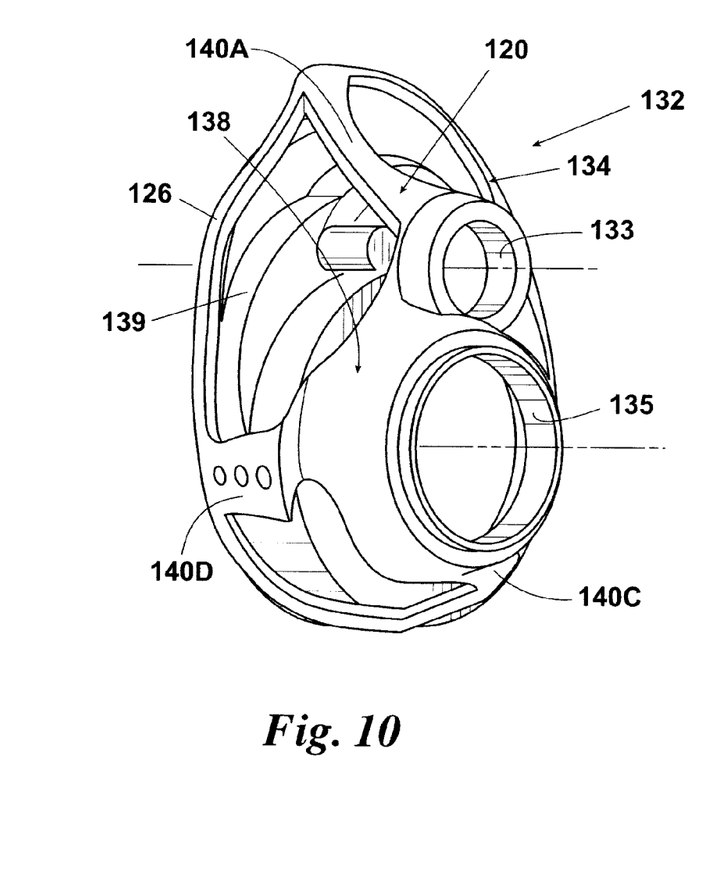
FIG. 10 is a perspective view of an outside surface of a second embodiment of a gear side skeletalized outer member covering the shroud member of FIG. 9.

Referring now to FIGS. 8-10, shown is an alternate embodiment of the palm side cover assembly, i.e, palm side cover assembly 118 (FIG. 8) and an alternate embodiment of a gear side cover assembly, i.e., gear side cover assembly 132 (FIGS. 9, 10).

Palm side cover assembly 118 has outside surface 120 and an inside surface. The inside surface is affixed to a palm side, e.g, palm side 14 of frame 12. Palm side cover assembly 118 defines a skeletal member 126, which is constructed of a strong material such as metals like aluminum, titanium, or other materials. A portion of skeletal member 126 is visible on outside surface 120. For example, legs 128A, 128B, and 128C converge in a central area 124. Interspersed between legs 128A, 128B and 128C are panel members 130. Panel members 130 are preferably constructed of lightweight materials, such as carbon fiber, plastics, or other materials. Panel members 130 may be transparent, translucent, or opaque, as desired. Additionally, panel members 130 may define vents or openings to further reduce weight and/or to allow a portion of the inside of the reel to be visible from an exterior of the reel, e.g., opening 131 as shown in FIG. 8.

Figure 11:
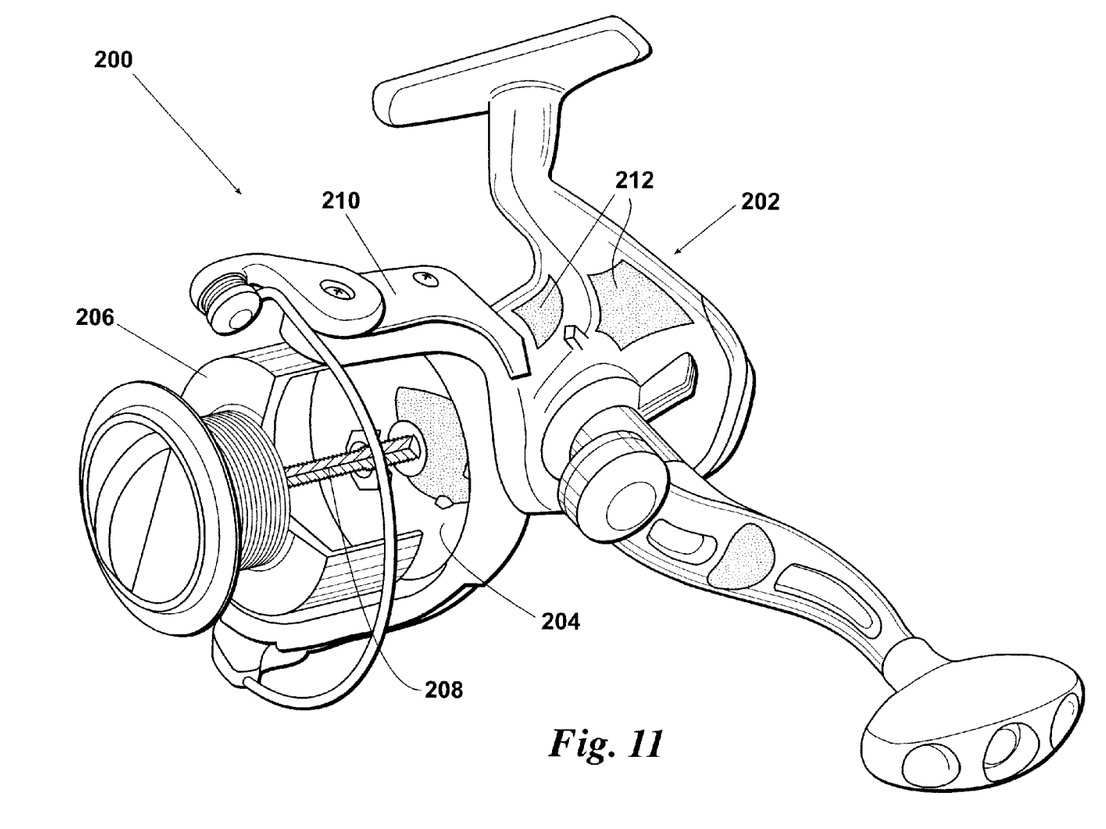
FIG. 11 is a perspective view of a spinning reel of the invention having a skeletalized outer member.

A second outer member, such as gear side cover assembly 132 has outside surface 134 (FIG. 9) and an inside surface 136 (FIG. 8). The inside surface 136 of gear side cover assembly 132 is affixed to a gear side, e.g., gear side 16 of frame 12. Gear side cover assembly 132 defines spool shaft orifice 133 and crank shaft orifice 135. Gear side cover assembly 132 is defined by second skeletal member 138, which is constructed of a strong material such as metals like aluminum, titanium, or other materials. A portion of second skeletal member 138 is visible on outside surface 134. For example, legs 140A, 140B, 140C, and 140D communicate with spool shaft orifice 133 and crank shaft orifice 135. Legs 140A, 140B, 140C, and 140D define voids therebetween. A shroud member 139 may be provided to restrain components adjacent to inside surface of gear side cover assembly 132. In the embodiment of FIG. 8, shroud member 139 is visible through the voids between legs 140A, 140B, 140C, and 140D. Shroud member 139 is preferably constructed of lightweight materials, such as carbon fiber, plastics, or other materials. Shroud members 139 may be transparent, translucent, or opaque, as desired Referring now to FIG. 11, shown is a reel 200, which is a spinning reel. Spinning reel 200 includes a body 202 defining a forwardly oriented face 204. A spool 206 is affixed to body 202 and mounted on axle 208. Axle 208 extends forwardly from face 204. A rotor assembly 210 is rotatably affixed to body 202. Body 202 defines a plurality of openings, i.e., body 202 is "skeletalized". Into each of the openings a mating panel member 212 is located. Panel members 212 are of the same type and serve the same purpose as panel members 30, discussed above.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:
   a frame having a first side and a second side;
   a spool shaft mounted in said frame for supporting a spool, said spool shaft defining a longitudinal axis having a first end proximate said first side of said frame and having a second end proximate to said second side of said frame;
   a first outer member affixed to said first side of said frame, wherein said first outer member defines supporting structure;
   a second outer member affixed to said second side of said frame, wherein said second outer member defines supporting structure;
   wherein at least one of said first outer member and said second outer member defines at least one weight reduction opening;

at least one non-supporting lightweight member received within said at least one weight reduction opening of said first outer member and said second outer member;

said supporting structure of said first outer member defines a plurality of legs that support a structural area that defines a component opening for receiving a reel component.

2. The fishing reel according to claim 1 wherein said at least one lightweight member comprises:
a first lightweight member between said first outer member and said first side of said frame, said first lightweight member visible within said at least one weight reduction opening defined by said first outer member;
a second lightweight member between said second outer member and said second side of said frame, said second lightweight member visible within said at least one weight reduction opening defined by said second outer member.

3. The fishing reel according to claim 2 wherein:
said first lightweight member is received within an opening in said first outer member and said second lightweight member is received within an opening in said second outer member for facilitating ease of removal and replacement to customize the appearance of the reel.

4. The fishing reel according to claim 1 wherein:
said supporting structure is comprised of a metal.

5. The fishing reel according to claim 1 wherein:
at least one of said first outer member and said second outer member defines an outer surface wherein said supporting structure comprises less than two-thirds of a total surface area and said at least one weight reduction opening comprises at least one third of the total surface area.

6. The fishing reel according to claim 1 wherein:
said lightweight member is comprised of non-metallic structure.

7. The fishing reel according to claim 1 wherein:
said lightweight member is comprised of a material selected from a group consisting of plastic polymer and carbon fiber.

8. The fishing reel according to claim 1 wherein:
said lightweight member is transparent.

9. The fishing reel according to claim 1 wherein:
the reel is a baitcast reel.

10. The fishing reel according to claim 1 wherein:
the reel is a spinning reel.

11. The fishing reel according to claim 1 wherein:
at least one of said first outer member and said second outer member is a cover assembly.

12. The fishing reel according to claim 1 wherein:
at least one of said first outer member and said second outer member is an exposed portion of a reel body.

13. A fishing reel comprising:
a frame having a first side and a second side;
a spool shaft mounted in said frame for supporting a spool, said spool shaft defining a longitudinal axis having a first end proximate said first side of said frame and having a second end proximate to said second side of said frame;
a first outer member affixed to said first side of said frame, wherein said first outer member defines supporting structure;
a second outer member affixed to said second side of said frame, wherein said second outer member defines supporting structure;
wherein at least one of said first outer member and said second outer member defines at least one weight reduction opening;

at least one non-supporting lightweight member received within said at least one weight reduction opening of said first outer member and said second outer member;

said supporting structure of at least one of said first outer member and said second outer member defines a plurality of legs that support a structural area that defines a mounting location for facilitating an attachment of a member to an inside surface of at least one of said first outer member and said second outer member, wherein said member rotationally supports said spool shaft of said reel.

14. A fishing reel comprising:
a frame;
a first cover assembly affixed to a first side of said frame, said first cover assembly defining supporting structure;
a second cover assembly affixed to a second side of said frame, said second cover assembly defining supporting structure;
wherein at least one of said first cover assembly and said second cover assembly defines at least one opening;
at least one non-supporting lightweight member received within said at least one opening;
said at least one lightweight member comprises a first lightweight member and a second lightweight member that is a panel member received within said at least one opening of said first cover assembly and said second cover assembly;
said first lightweight member is a shroud member partially covered by and visible through said first cover assembly and;
said second lightweight member is a shroud member partially covered and visible through said second cover assembly.

15. The fishing reel according to claim 14 wherein:
said supporting structure is comprised of a metal.

16. The fishing reel according to claim 14 wherein:
one of said first cover assembly and said second cover assembly define an outer surface wherein said supporting structure comprises less than two-thirds of a total surface area and said at least one opening comprises at least one third of a total surface area.

17. The fishing reel according to claim 14 wherein:
said lightweight member is comprised of non-metallic structure.

18. The fishing reel according to claim 17 wherein:
said lightweight member is comprised of a material selected from a group consisting of plastic polymer and carbon fiber.

19. The fishing reel according to claim 14 wherein:
said lightweight member is transparent.

20. The fishing reel according to claim 14 wherein:
said lightweight member is received within said at least one opening of a respective one of said first cover assembly and said second cover assembly for facilitating ease of removal and replacement to customize the appearance of the reel.

21. A fishing reel comprising:
a frame having a first side and a second side;
a spool shaft mounted in said frame for supporting a spool, said spool shaft defining a longitudinal axis having a first end proximate said first side of said frame and having a second end proximate to said second side of said frame;
a first outer member affixed to said first side of said frame, wherein said first outer member defines metal supporting structure, said supporting structure of said first outer member defines a plurality of legs that support a structural area that defines a component opening for receiving a reel component;

a second outer member affixed to said second side of said frame, wherein said second outer member defines metal supporting structure;

wherein said first outer member defines at least one weight reduction opening;

wherein said second outer member defines at least one weight reduction opening;

a first non-supporting lightweight member between said first outer member and said first side of said frame, said first lightweight member received within said at least one weight reduction opening of said first outer member;

a second non-supporting lightweight member between said second outer member and said second side of said frame, said second lightweight member received within said at least one weight reduction opening of said second outer member;

wherein said first lightweight member and said second lightweight member are non-metallic;

wherein at least one of said first outer member and said second outer member defines an outer surface wherein said supporting structure comprises less than two-thirds of a total surface area and said at least one weight reduction opening comprises at least one third of the total surface area.

* * * * *